United States Patent [19]

Temple

[11] 4,185,066

[45] Jan. 22, 1980

[54] METHOD OF TREATING MAGNESIUM OXCHLORIDE AND MAGNESIUM OXYSULFATE ARTICLES TO REDUCE EFFLORESCENCE

[75] Inventor: Chester S. Temple, McKees Rocks, Pa.

[73] Assignee: PPG Industries, Inc., Pittsburgh, Pa.

[21] Appl. No.: 935,037

[22] Filed: Aug. 18, 1978

[51] Int. Cl.$^2$ .................... B32B 17/02; C04B 9/02
[52] U.S. Cl. ................................. 264/257; 264/333; 264/DIG. 43; 106/106; 423/472; 423/544
[58] Field of Search .............. 106/105, 106; 423/462, 423/472, 544, 554; 264/232, 233, 340, 344, 234, 345, 333, DIG. 43

[56] References Cited

U.S. PATENT DOCUMENTS

| | | | |
|---|---|---|---|
| 145,363 | 12/1873 | Ransome. | |
| 1,690,305 | 11/1928 | Manning | 264/233 X |
| 1,853,521 | 4/1932 | Stewart | 106/106 X |
| 2,712,512 | 7/1955 | Biefeld et al. | 264/257 X |
| 2,939,799 | 6/1960 | Chisholm | 106/108 |
| 2,944,291 | 7/1960 | Prior et al. | 106/106 X |
| 3,275,724 | 9/1966 | Klingel | 264/82 |
| 3,320,077 | 5/1967 | Prior et al. | 106/106 X |
| 3,327,032 | 6/1967 | Adams | 264/82 |
| 3,634,567 | 1/1972 | Yang | 264/82 |

*Primary Examiner*—Earl C. Thomas
*Attorney, Agent, or Firm*—John E. Curley

[57] ABSTRACT

A method of improving the surface characteristics of a formed article of magnesium oxychloride or magnesium oxysulfate cement is shown in which molded articles of magnesium oxychloride or magnesium oxysulfate are treated with water at temperatures of 90° F. to 212° F. (32.2° C. to 100° C.) for periods of 1 to 30 minutes or longer to prevent the formed article from efflorescing.

8 Claims, No Drawings

METHOD OF TREATING MAGNESIUM OXCHLORIDE AND MAGNESIUM OXYSULFATE ARTICLES TO REDUCE EFFLORESCENCE

BACKGROUND OF THE INVENTION

Inorganic plastic cements such as magnesium oxychloride and oxysulfate plastic cements have been described in numerous patents. Cements of these types are highly desirable if they can be properly molded, and remain truly insoluble since they possess excellent fire retardant properties. Numerous applications of molded oxychloride cement parts for use in fire rich areas such as boat parts, building panels and the like suggest themselves. Difficulty has been encountered however in the preparation of molded plastic oxychloride cement parts due to their tendency of efflorescence.

Typical cements are described in the prior art in U.S. Pat. Nos. 3,220,077 and 2,939,799. While these patents readily produce plastic oxychloride cements, it has been found that molded parts made from cements using the prior art teachings have often led to finished parts that effloresce rendering them less than satisfactory.

THE PRESENT INVENTION

It has been found in accordance with the instant invention that acceptable magnesium oxychloride and/or magnesium oxysulfate articles can be prepared by molding techniques and these articles may be treated in such a manner after formation that the tendency to effloresce is eliminated or minimized. Thus, it has been found that molded articles of magnesium oxychloride and/or magnesium oxysulfate may be contacted with water at temperature of at least 90° F. (32.2° C.), typically in the range of 90° F. to 212° F. (32.2° C. to 100° C.) for periods of 1 to 30 minutes and the resulting articles are substantially free of the tendency to effloresce common to such material. For convenience the invention will be described with reference to the magnesium oxychloride species.

The treatment employed may be rendered in many ways. Typically, the articles are immersed in a water bath for the requisite time period and the bath is maintained above 90° F. (32.2° C.) and preferably in the range of 150° F. to 212° F. (66° C. to 100° C.). The time of immersion is at least 1 minute and typically ranges between 1 and 30 minutes. In general, in the preferred temperature range, the time of treatment is on the order of 2 to 20 minutes since at higher temperatures, treatment times required to produce satisfactory articles are shortened. If it is desired, the articles of magnesium oxychloride may be treated by simply contacting their surfaces with a water spray or water stream to thoroughly wet them, allowing the water to wash off them continuously during treatment provided the temperatures and times of treatment are adhered to in such an operation. So long as the articles being treated have their entire surface contacted with the warm to hot water for the requisite time, the articles after treatment will be enhanced by having their tendency to effloresce abated or eliminated.

Magnesium oxysulfate and oxychloride cements are formed by the intimate mixing of concentrated solutions of magnesium sulfate or magnesium chloride with magnesium oxide. Magnesium sulfate solutions may typically contain 50 to 75 percent by weight magnesium sulfate solids. Magnesium chloride solutions used typically contain from 60 percent to 85 percent by weight solids. The mole ratios of magnesium oxide to hydrated sulfate used to prepare magnesium oxysulfate cements are typically in the range of between 3 to 1 to 14 to 1. The mole ratios of magnesium oxide to hydrated magnesium chloride are typically in the range of 3.3 to 1 to about 7.5 to 1. It is preferred in manufacturing the magnesium oxysulfate cements to provide an oxysulfate having the formula $5MgO \cdot MgSO_4 \cdot 8H_2O$. The preferred magnesium oxychloride cement is one having the formula $5MgO \cdot MgCl_2 \cdot 9H_2O$.

The process of the present invention further contemplates the provision of a phosphate in the cement in an amount sufficient to improve the wet strength of the cement, preferably by providing a phosphate dissolved in the concentrated magnesium salt solution. Thus, for instance, the following water soluble phosphates can be used: phosphoric acids, including orthophosphoric, pyrophosphoric acid and monomagnesium phosphate; polyphosphates, including pyrophosphates, tripolyphosphates, tetrapolyphosphates and long chain polyphosphates, particularly sodium polyphosphates, such as sodium hexametaphosphate and sodium tripolyphosphate and various other alkali metal polyphosphates; the various alkali metal mono and dibasic phosphates such as mono basic sodium phosphate and the various ammonium phosphates such as ammonium polyphosphate and the like. The various classes of water soluble phosphate compounds are described in "Phosphorous and Its Compounds," Volume 1, CHEMISTRY By John R. Van Wazer, Interscience Publishers, Inc., New York (1958).

The water soluble phosphate salts cannot be dissolved directly in highly concentrated magnesium salt solutions. They must be first dissolved in water and then the magnesium salt dissolved in the water. The polyphosphates are particularly preferred in this instance since they maintain the magnesium salt in solution where the solution is cooled to less than ambient temperatures, probably by chelation. The strongly acid phosphate salts as well as the acids are also particularly preferred for this purpose. Thus, the solution used in the preparation of the inorganic plastic cement slurries comprises a water solution of (a) a magnesium salt selected from the group consisting of magnesium chloride and magnesium sulfate, the solution containing a concentration of magnesium salts such that water soluble phosphate salts will not dissolve upon addition to the magnesium salt solution and (b) about one to six percent by weight based upon the weight of the magnesium salt hydrate of a water soluble phosphate salt dissolved in the solution are contemplated as reactive magnesium salt solutions in the present invention.

The present invention also contemplates the use of difficultly soluble salts of the phosphates in the inorganic plastic cement slurries of the present invention to improve the wet strength of the cured cement. The use of such salts as well as other materials in magnesium cements has been found by the prior art to improve the properties of the resulting cured inorganic plastic cements. Thus, for instance, phosphates or secondary phosphates of metals such as the alkaline earth metal phosphates which are difficultly soluble, including calcium and magnesium phosphates as well as aluminum and copper magnesium phosphates as well as aluminum and copper phosphates and acid phosphates can be used. Various other difficultly soluble metal phosphates can be used such as those described in U.S. Pat. No. 2,351,641; however, they are not preferred.

The soluble phosphate salts are preferred over the insoluble phosphate salts primarily because of the better wet strengths of the cements produced. This is believed to be because of the interaction of the soluble phosphate salts with the magnesium oxide to form insoluble magnesium phosphate complexes or compounds which improve the wet strength of the resulting cured cement product. Sodium hexametaphosphate is particularly preferred.

In a typical formulation of a magnesium oxychloride cement which can be formed into a solid article of magnesium oxychloride, magnesium chloride ($MgCl_2.6H_2O$) is mixed with water, phosphoric acid ($H_3PO_4$) and sodium hexametaphosphate ($(NaPO_3)_6$. To the resulting mixture there is added magnesium oxide in the requisite amount to form a paste-like material which upon setting or molding produces a magnesium oxychloride ($MgO.MgCl_2.6H_2O$) article. The $MgO.MgCl_2$ weight ratio in preparing the cement mixtures is in general maintained between 40 to 60 percent. The cements are cured by standing at room temperature in a mold of the desired shape or they are cured using elevated temperatures and pressures such as by molding in a press. Conditions suitable for such a molding operation are described in detail in the aforementioned U.S. Pat. No. 3,320,077.

Since is is important that the magnesium oxide-magnesium salt solutions (chlorides or sulfates) be blended so as to deagglomerate and deflocculate the magnesium oxide particles and to disperse the magnesium oxide in the magnesium salt solutions, it is necessary that high shear blending techniques be used in the mixing process. If not used, the resultant cured cements will not possess the water insoluble oxychloride and oxysulfate systems and thus will have poor properties. The equipment necessary for high shear blending as practiced by this invention is known in the art and mixing equipment such as sonic homogenizers, colloid mills, high pressure impact mills, turbine and propeller mixers and the like may be employed. Detailed descriptions of these mixers are described in CHEMICAL ENGINEERS' HANDBOOK (3rd Edition) 1950, at pages 1202–1214.

It has been found that enhanced production of magnesium oxychloride cements may be realized by regulating the mixing of the magnesium chloride solutions and the requisite amounts of magnesium oxide.

Thus, in the preferred method employed up to 75 percent of the magnesium oxide is mixed with about 80 to 90 percent of the magnesium chloride required to produce the oxychloride cement and the mixing is conducted at low speed (low shear). The remaining magnesium oxide is added and mixed using high shear blending to produce a homogeneous mixture. At this time the remaining magnesium chloride is added and mixed under high shear. The temperature of the chloride-oxide mix during the entire mixing is thereby maintained at about 130° F. (54° C.). These regulated mixing procedures insure that premature setting of the cement does not occur in the mixing equipment.

The invention is illustrated below in the following examples:

EXAMPLE 1

A magnesium oxychloride cement was prepared and formed into a panel in the following manner. A 2.8 gram quantity of sodium hexametaphosphate was dissolved in 105.5 grams of water in a Waring blender. The blender was activated and set on low speed and 5.6 grams of phosphoric acid were added to the mixture in the blender. After all of the acid was added, 303.8 grams of magnesium chloride ($MgCl_2.6H_2O$) were added and mixed with the blender ingredients until all of the magnesium chloride was dissolved with the blender still being operated at low speed. While still stirring at low speed, magnesium oxide was added until the mixture became viscous enough to impede mixing. At this point about 75 percent of the requisite magnesium oxide had been added. The blender was then switched to high speed and further magnesium oxide was added until 282 grams of magnesium oxide had been introduced and mixed with the blender ingredients. The mixture at this point maintained itself at a temperature of 130° F. (54° C.) or less. An additional 47.5 grams of $MgCl_2.6H_2O$ were then added and thoroughly mixed with the blender contents at high speed and the temperature of the mixture did not increase above 130° F. (54° C.). The resulting mixture was then cooled by immersing the blender in a water bath until the mixture in the blender reached a temperature of 72° F. to 75° F. (22.2° C. to 23.9° C.).

The resulting magnesium oxychloride mixture was placed in a 12 inch by 12 inch (30.48 centimeter by 30.48 centimeter) mold which had a ¾ ounce fiber glass mat placed therein. The mat weighed 66.74 grams and 267 grams of the magnesium oxychloride cement mixture were added to the mold. The mold was placed in a platen press at 205° F. to 230° F. (79.6° C. to 110° C.) for 5 to 10 minutes with about 20 to 25 tons pressure exerted on the mold. A 12 inch by 12 inch (30.48 centimeter by 30.48 centimeter) panel was removed from the mold, rinsed with hot tap water and placed in a humidity chest set at 80 percent relative humidity at 120° F. (49° C.) for 70 hours. The panel upon removal and under visual inspection exhibited efflorescence on all surfaces.

EXAMPLE 2

A magnesium oxychloride cement was prepared and formed into a panel in the following manner. A 2.8 gram quantity of sodium hexametaphosphate was dissolved in 105.5 grams of water in a Waring blender. The blender was activated and set on low speed and 5.6 grams of phosphoric acid was added to it. After all of the acid was added, 303.9 grams of magnesium chloride ($MgCl_2.6H_2O$) were added and mixed with the blender ingredients until all of the magnesium chloride was dissolved, with the blender still being operated at low speed. While still operating the blender at low speed, magnesium oxide was added thereto until the mixture became viscous enough to impede mixing. At this point about 75 percent of the requisite magnesium oxide had been added. The blender was then switched to high speed and further magnesium oxide was added until 282 grams of the oxide had been introduced and mixed with the blender ingredients. The ingredients at that point did not exceed a temperature of 130° F. (54° C.). An additional 47.5 grams of $MgCl_2.6H_2O$ was then added and thoroughly mixed with the blender contents at high speed without incurring any appreciable temperature rise and the ingredients did not exceed 130° F. (54° C.). The resulting mixture was then cooled in the blender which was immersed in a water batch until the mixture in the blender reached a temperature between 72° F. to 75° F. (22.2° C. to 23.9° C.).

The resulting magnesium oxychloride cement mixture was placed in a 12 inch by 12 inch (30.48 centimeter by 30.48 centimeter) mold which had a ¾ ounce fiber glass mat placed therein. The mat weighed 65 grams and 260 grams of magnesium oxychloride cement were added to the mold. The mold was placed in a platen press operating at 205° F. to 230° F. (79.6° C. to 110° C.) for 5 minutes at about 20 to 25 tons pressure on the mold. A 12 inch by 12 inch (30.48 centimeter by 30.48 centimeter) panel was removed from the mold and placed in a water tank to a depth of 8 inches (20.32 centimeters) at 210° F. to 212° F. (99° C. to 100° C.) for 2 minutes. The panel was then removed and was placed in a humidity chest set at 80 percent relative humidity at 120° F. (49° C.) for 70 hours. The panel was removed from the chest and visual examination showed that the 8 inch (20.32 centimeter) section of the panel subjected to the water treatment exhibited no efflorescence while the upper 4 inches (10.16 centimeters) had effloresced considerably.

In those applications of the instant invention wherein magnesium oxysulfate articles are treated, a magnesium sulfate hydrate ($MgSo_4.7H_2O$) is used as the sulfate component and this is combined with magnesium oxide to provide a cement of magnesium oxysulfate of the composition $5MgO.MgSO_4.8H_2O$. The magnesium oxysulfate compositions are prepared in the same manner as shown hereinbefore with respect to the magnesium oxychloride cements and the treatments in accordance with the instant invention are used to render the surfaces of the panels free of the efflorescence problem associated with those panels when they are prepared as in Example 1 hereinabove.

As with the preparation of magnesium oxychloride cements, it is advantageous in preparing the oxysulfate species to mix the magnesium oxide and the magnesium sulfate in a manner such that about 80 to 90 percent of the magnesium sulfate is first mixed with all of the oxide of the final mixture and to conduct the final mixing by adding the remaining sulfate to the previously formed mixture of sulfate and oxide while maintaining that mixture below about 130° F. (54° C.).

"High shear" as used herein means the shear forces applied to ingredients being mixed to produce oxychloride or oxysulfate cements equivalent to the shear forces applied to such ingredients by a propeller mixer such as a Waring blender or an Osterizer blender operating at a speed of 10,000 rpm or greater.

"Low shear" as used herein means the shear forces applied to ingredients being mixed to produce oxychloride or oxysulfate cements equivalent to the shear forces applied to such ingredients by a propeller mixer such as a Waring blender or Osterizer blender operating at a speed of less than 10,000 rpm.

As will be readily appreciated from the above examples, the instant invention produces a molded magnesium oxychloride or oxysulfate of enhanced properties in that a serious effloresence problem is substantially reduced or eliminated by practicing the invention.

While the invention has been described with reference to certain specific embodiments, it is not intended to be limited thereby except insofar as appears in the accompanying claims.

I claim:

1. A method of manufacturing an article of magnesium oxychloride or oxysulfate cement comprising reacting magnesium chloride or magnesium sulfate with sufficient quantities of magnesium oxide to form magnesium oxychloride or oxysulfate cement paste; introducing said paste into a mold containing a fiber glass mat as reinforcement for the cement; molding the cement and fiber glass mat under pressure to form a solid article of fiber glass reinforced magnesium oxychloride or oxysulfate cement, removing the solid article so formed from the mold and contacting the solid article with water at a temperature of at least 90° F. for a period of time of at least one minute to thereby form an article having a reduced tendency to effloresce.

2. A method of producing a fiber glass reinforced magnesium oxychloride or magnesium oxysulfate panel comprising reacting magnesium oxide with magnesium chloride or magnesium sulfate to form a magnesium oxychloride or magnesium oxysulfate paste; introducing the resulting paste into a pressure mold containing a fiber glass reinforcing mat; pressure molding the mat and the magnesium oxychloride or oxysulfate paste in said mold to form a solid fiber glass reinforced magnesium oxychloride or oxysulfate panel removing the solid article from the mold and subjecting the article after formation by contact with water at 90° F. to 212° F. for a period of at least one minute to thereby form a panel having a reduced tendency to effloresce.

3. The method of claim 1 wherein said contact is between 2 to 15 minutes in duration.

4. The method of claim 1 wherein said articles are immersed in water to effect said contact.

5. The method of claim 2 wherein said water is at temperature between 150° F. to 212° F. (66° C. to 100° C.) and said contact time is between 2 to 20 minutes.

6. The method of claim 1 wherein said articles are immersed in water to effect said contact, the water is at temperature of 90° F. (32.2° C.) or higher and the time of said contact is at least 2 minutes.

7. The method of claim 1 wherein said contact is effected by spraying water on said articles.

8. The method of claim 7 wherein said water is sprayed at temperature between 90° F. to 212° F. (32.2° C. to 100° C.) for between 1 to 30 minutes.

* * * * *